(12) United States Patent
Yu et al.

(10) Patent No.: US 11,864,699 B2
(45) Date of Patent: *Jan. 9, 2024

(54) CLEANING DEVICE

(71) Applicant: Beijing Roborock Technology Co., Ltd., Beijing (CN)

(72) Inventors: Guang Yu, Beijing (CN); Song Peng, Beijing (CN); Xiaoliang Wang, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,495

(22) Filed: Oct. 11, 2022

(65) Prior Publication Data

US 2023/0066176 A1 Mar. 2, 2023

Related U.S. Application Data

(63) Continuation of application No. 17/811,356, filed on Jul. 8, 2022, which is a continuation of application No. PCT/CN2020/136583, filed on Dec. 15, 2020.

(30) Foreign Application Priority Data

Jan. 10, 2020 (CN) .......................... 202020056974.2

(51) Int. Cl.
*A47L 11/40* (2006.01)
*A47L 11/02* (2006.01)

(52) U.S. Cl.
CPC ........... *A47L 11/4002* (2013.01); *A47L 11/02* (2013.01); *A47L 2201/06* (2013.01)

(58) Field of Classification Search
CPC .. A47L 11/4002; A47L 11/02; A47L 2201/06; A47L 11/4061; A47L 9/30; A47L 9/2889; A47L 11/4011; A47L 2201/04; G05D 1/0227; G05D 1/0246; G05D 2201/0203; H04N 23/56; H04N 23/55;
(Continued)

(56) References Cited

U.S. PATENT DOCUMENTS 10,463,219 B2 11/2019 Koura
2018/0206687 A1 7/2018 Kim et al.

FOREIGN PATENT DOCUMENTS

| CN | 203828847 U | 9/2014 |
|---|---|---|
| CN | 105615778 A | 6/2016 |
| CN | 205336383 U | 6/2016 |

(Continued)

OTHER PUBLICATIONS

International Search Report for PCT Patent Application No. PCT/CN2020/136583 dated Mar. 17, 2021.
(Continued)

*Primary Examiner* — David Redding
(74) *Attorney, Agent, or Firm* — Thomas Horstemeyer, LLP

(57) ABSTRACT

An intelligent cleaning device, comprising a device main body, a camera and a fill-in light, wherein the camera is mounted in the device main body and faces an outer side of the device main body; the fill-in light is mounted in the device main body by means of a fill-in light holder and faces the outer side of the device main body; and an irradiation direction of the fill-in light is the same as a photographic direction of the camera, so as to irradiate at least part of an identification region of the camera.

19 Claims, 4 Drawing Sheets

(58) Field of Classification Search
CPC ....... H04N 23/57; F21V 33/0044; F21V 5/04; H05B 47/105
See application file for complete search history.

(56) References Cited

FOREIGN PATENT DOCUMENTS

| | | | |
|---|---|---|---|
| CN | 106725131 | A | 5/2017 |
| CN | 106821155 | A | 6/2017 |
| CN | 107137026 | A | 9/2017 |
| CN | 107175645 | A | 9/2017 |
| CN | 108652532 | A | 10/2018 |
| CN | 209595660 | U | 11/2019 |
| CN | 210927761 | U | 7/2020 |
| TW | 201740866 | A | 12/2017 |
| TW | 2020000111 | A | 1/2020 |
| WO | 2019234384 | A1 | 12/2019 |

OTHER PUBLICATIONS

Office Action dated Jan. 2, 2023 in co-pending Indian Patent Application No. 202237044834 filed Aug. 5, 2022.
First Office Action for TW Patent Application No. 11120208220 dated Mar. 4, 2022.

CLEANING DEVICE

CROSS-REFERENCE TO RELATED APPLICATION

This application is a continuation of and claims the benefit of U.S. patent application Ser. No. 17/811,356, entitled "CLEANING DEVICE," and filed Jul. 8, 2022, which claims the benefit of International Application No. PCT/CN2020/136583, filed on Dec. 15, 2020, which claims priority to Chinese Utility Model Application No. 202020056974.2, filed on Jan. 10, 2020, all of which are incorporated herein by reference in their entireties.

TECHNICAL FIELD

The present disclosure relates to the field of technologies of cleaning tools, and more specifically, to a cleaning apparatus.

BACKGROUND

As the communications technologies develop rapidly, intelligent products get common increasingly in daily life, and many movable cleaning apparatuses, for example, intelligent sweepers, have emerged. The cleaning apparatuses can automatically perform cleaning and offer users convenience. An existing cleaning apparatus is typically provided with a camera to perform functions of object recognition, navigation, locating, and the like. However, due to influence from an external environment, the camera often cannot collect an image or collects an unclear image that is unrecognized. Consequently, the cleaning apparatus cannot perform the functions of object recognition, navigation, locating, and the like at all, thereby greatly affecting use of the cleaning apparatus by users and deteriorating user experience.

Therefore, a cleaning apparatus is required to resolve the problems in the conventional technology at least partially.

SUMMARY

In content of the present disclosure, a series of concepts with simplified forms are introduced, and the concepts are further described in detail in the descriptions of embodiments. The content of the present disclosure does not mean that the present disclosure should attempt to define critical features and necessary technical features of the technical solution that claims protection, and does not mean either that the present disclosure should attempt to determine a protection scope of technical solution that claims protection.

According to an aspect of the present disclosure, a cleaning apparatus is provided. The cleaning apparatus includes a device body; a camera, wherein the camera is mounted on the device body through a camera support and is oriented outside of the device body; and an illuminator, wherein the illuminator is disposed below the camera, and is mounted on the camera support through an illuminator support and is oriented outside of the device body.

Another cleaning apparatus is provided. The cleaning apparatus comprising: a device body; a bumper, connected to the device body and comprising an opening; a camera, mounted on the device body; and an illuminator, disposed below the camera and mounted on the device body; wherein both the camera and the illuminator are oriented outside of the device body through the opening.

BRIEF DESCRIPTION OF DRAWINGS

The following accompanying drawings of the present disclosure are provided for better understanding of the present disclosure and are incorporated herein as a part of the present disclosure. The accompanying drawings illustrate embodiments of the present disclosure and descriptions thereof, to explain an apparatus according to the present disclosure and its principle. In the accompanying drawings.

DESCRIPTION OF EMBODIMENTS

Figure 1:
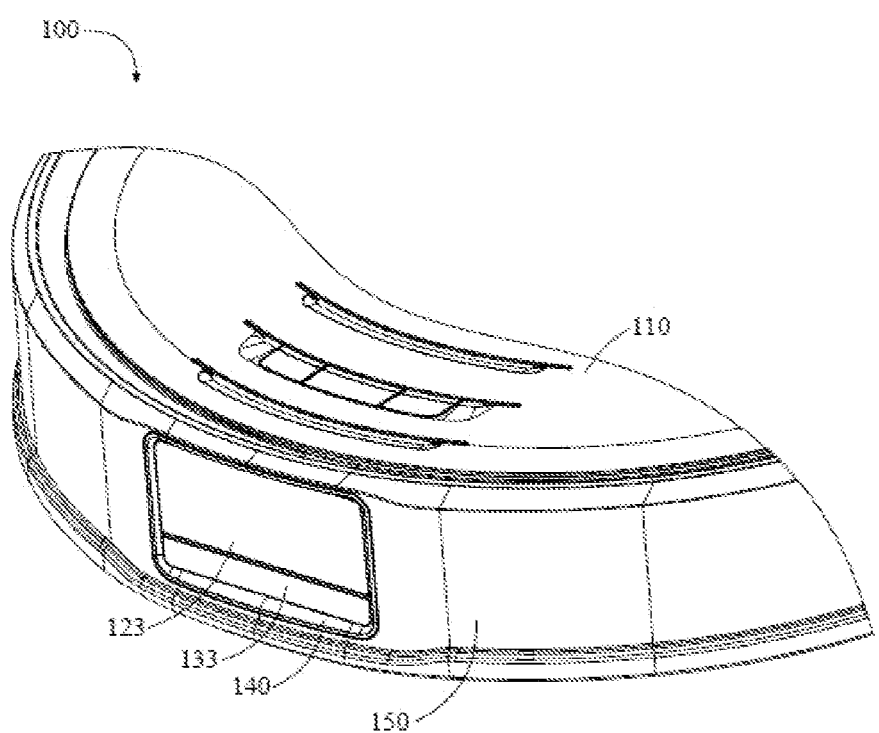
FIG. 1 illustrates a schematic stereoscopic diagram of a part of a cleaning apparatus according to an implementation of the present disclosure.

In the following descriptions, many specific details are provided for more thorough understanding of the present disclosure. However, it can be easily understood by one of ordinary skill in the art that, the present disclosure can be implemented without one or more of the details. In other examples, to avoid confusion with the present disclosure, some technical features commonly known in the art are not described.

For thorough understanding of the present disclosure, the following descriptions provide detailed structures to facilitate illustration of the present disclosure. Clearly, embodiments of the present disclosure are not limited to specific details well known to one of ordinary skill in the art. Detailed descriptions of preferred implementations of the present disclosure are as follows. However, apart from the detailed descriptions, there may further be other implementations in the present disclosure. The present disclosure cannot be construed to be limited to implementations provided in this specification.

It should be understood that, terms used in this specification are merely for describing specific implementations, and are not intended to limit the present disclosure. "A", "one" and "the" used with a singular form further imply and include a plural form, unless stated clearly otherwise in the context. When terms "include" and/or "comprise" are used in this specification, the terms indicate clearly the presence of the mentioned features, entirety, steps, operations, elements and/or components, but it is not excluded presence or addition of one or more other features, entirety, steps, operations, elements, components, and/or a combination thereof. Terms "above", "below", "front", "rear", "left", "right", and similar expressions used in the present disclosure are merely for description without limitation.

Ordinal numbers such as "first" and "second" used in the present disclosure are merely for indication, but do not have any other meaning, for example, a specific sequence. In addition, for example, a term "first component" does not suggest that there is a "second component", and the term "second component" does not suggest that there is the "first component".

The specific implementations of the present disclosure will be described hereinafter in details with reference to the accompanying drawings. The accompanying drawings illustrate representative implementations of the present disclosure, but are not intended to limit the present disclosure.

Typically, a cleaning apparatus mainly includes a device body. The device body has a shape similar to a circle (and both a front side and a rear side are circular), or has other shape. It could be understood that, a cleaning apparatus illustrated in the present disclosure may be a sweeping robot, a mopping robot, a sweeping-mopping robot, or the like.

The cleaning apparatus includes a cleaning system, a sensing system, a control system, a drive system, an energy system, a human-machine interaction system, and the like. The systems cooperate and coordinate with each other, so that the cleaning apparatus can move autonomously, to perform cleaning. Functional elements and the like for forming the foregoing systems of the cleaning apparatus are integrated and disposed on the device body. The device body includes an upper cover, a chassis, and a middle frame disposed between the upper cover and the chassis. The middle frame is configured as a basic framework for disposing the various functional elements. The upper cover and the chassis cover surfaces of the device body, so as to protect internal components and parts and improve ornamentality of the cleaning apparatus.

The sensing system is configured for the cleaning apparatus to sense an external environment such as topography, and includes sensing devices such as a location determining device, a bumper, a cliff sensor, an ultrasonic sensor, an infrared sensor, a magnetometer, an accelerometer, a gyroscope, and an odograph. The sensing devices provide various location information and motion status information of the cleaning apparatus to the control system. The location determining device includes but is not limited to an infrared transmitting and receiving device, a camera, and a laser distance sensor (LDS). The bumper is configured to cushion a collision between the cleaning apparatus and a surrounding object during travelling. A layer of soft rubber is provided on a surface of the bumper, and the bumper is disposed at a preset distance from the device body when the bumper is mounted onto the device body, so that it is ensured that the device body can have enough time to decelerate when collision occurs.

The control system is disposed on a circuit board in the device body. It should be understood that various control circuits configured to control the cleaning apparatus to operate are disposed on the circuit board. The control system includes a computing processor in communication with a non-transitory memory, and the like. The computing processor may be a central processing unit, an application processor, or the like, and draws, based on obstacle information fed back by the laser distance sensor and through a locating algorithm, a real-time map of an environment that the cleaning apparatus is located in. In addition, the computing processor comprehensively determines, based on distance information and speed information fed back by the bumper and the sensing devices, an operation status of the cleaning apparatus, for example, crossing a doorsill, getting on a carpet, or being located at a steep, being stuck at a lower part or at an upper part, a dust box of the cleaning apparatus being full, or the cleaning apparatus being picked up. And the computing processor provides a specific strategy for a next action for different cases, so that services of the cleaning apparatus satisfy the requirement of a user better, thereby improving user experience.

The human-machine interaction system includes a button on a main body panel, wherein the button is configured for a user to select a function; further includes a display and/or an indicating light and/or a speaker, wherein the display, the indicating light, and the speaker show the user a current status of the cleaning apparatus or selection of a function. The human-machine interaction system further includes a mobile phone client application. For a path navigation cleaning apparatus, a map of an environment that the device is located in and a location of the cleaning apparatus can be displayed to the user on a mobile phone client, and more and more user-friendly function items can be offered to the user.

The energy system is configured to supply power to the functional elements of the systems for working, and mainly includes a rechargeable battery and a power supply circuit. The rechargeable battery may be a nickel-hydrogen battery or a lithium battery. When a power of the rechargeable battery is less than a preset minimum power, the rechargeable battery may be connected to a charging device through a recharging electrode disposed at a lateral side or a lower side of the device body.

The cleaning system is configured to perform cleaning, and includes a dry cleaning part and a wet cleaning part. The dry cleaning part mainly cleans solid particle contaminants on a surface to be cleaned through a structure such as a cleaning brush, and the wet cleaning part mainly wipes the surface to be cleaned (for example, a floor) through a cleaning cloth with a cleaning liquid.

The dry cleaning part mainly includes a cleaning assembly, a dust box and a fan. A primary brush of the cleaning assembly can sweep trash. The fan is communicated with the dust box through a wind channel, and the fan is configured to generate wind required for collecting dust. Specifically, as the cleaning apparatus moves, the primary brush that interfere with the floor to some extent sweeps the trash on the floor and takes the trash to a front side of a dust collection port between the primary brush and the dust box, and then the trash is suctioned into the dust box by air with suction force that is generated by the fan and passes through the dust box.

The wet cleaning part mainly includes a liquid storage box and the cleaning cloth. The liquid storage box of the wet cleaning part stores the cleaning liquid, and the cleaning cloth is detachably disposed on the liquid storage box. After the dry cleaning part finishes cleaning, the cleaning liquid flows from the liquid storage box of the wet cleaning part to the cleaning cloth, and the cleaning cloth is configured to wipe a floor having cleaned by the primary brush and the like.

The dry cleaning part may further include a side brush. The side brush is mounted to the device body through a rotating shaft. Specifically, the side brush is mounted at an edge of the device body from a bottom of the device body through the rotating shaft. The side brush can rotate around a rotation axis of the rotating shaft with respect to the device body, to move small pieces of trash (for example, debris or hairs) into a cleaning area of the primary brush.

A cleaning apparatus 100 according to an implementation of the present disclosure will be described hereinafter with reference to FIG. 1 to FIG. 4. The cleaning apparatus 100 according to the present disclosure has structures/configuration and functions of the foregoing parts. For brevity, details thereof will not be elaborated here. The cleaning apparatus 100 further includes an illuminator 131, configured to increase light intensity in an environment, and specifically configured to increase light intensity in a recognition area of a camera 121.

Figure 2:
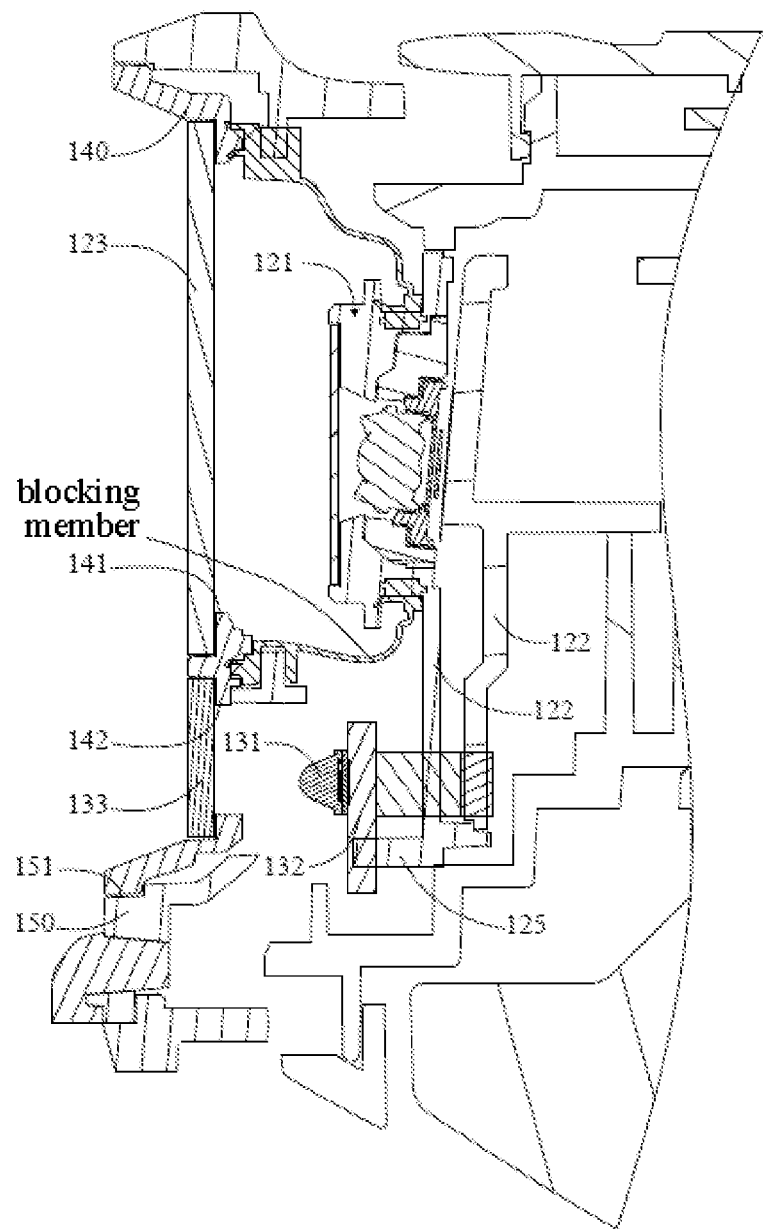
FIG. 2 illustrates a schematic cross-section diagram of a part of a cleaning apparatus illustrated in FIG. 1.

As illustrated in FIG. 1 and FIG. 2, the camera 121 is disposed on a device body 110 and is oriented toward outside of the device body 110, and is configured to pick up an image of the environment, to perform functions of object recognition, navigation, locating, and the like. The illuminator 131 is also disposed on the device body 110 and is oriented toward outside of the device body 110. Specifically, both the camera 121 and the illuminator 131 are disposed at a substantially front most end of the device body 110 based on an advancing direction, so that the camera 121 can pick up an image when the cleaning apparatus 100 moves forward. An illuminating direction of the illuminator 131 is substantially the same as an image-picking-up direction of the camera 121, so that at least part of the recognition area of the camera 121 is illuminated.

In this implementation, an illuminating direction of the illuminator 131 is substantially the same as an image picking-up direction of the camera 121, such that the light intensity in the recognition area of camera 121 is increased by light emitted by the illuminator 131, so that the camera 121 can pick up a required image even if intensity of ambient light is poor, and the cleaning apparatus 100 can perform functions of object recognition, navigation, locating, and the like in a case of poor intensity of ambient light. In addition, the camera 121 and the illuminator 131 are disposed on the device body 110, so that the camera 121 and the illuminator 131 can be protected, and the camera 121 and the illuminator 131 are avoided to be easily bumped and damaged due to exposure to the outside, thereby reducing material and labor costs for maintaining the camera 121 and the illuminator 131.

Figure 3:
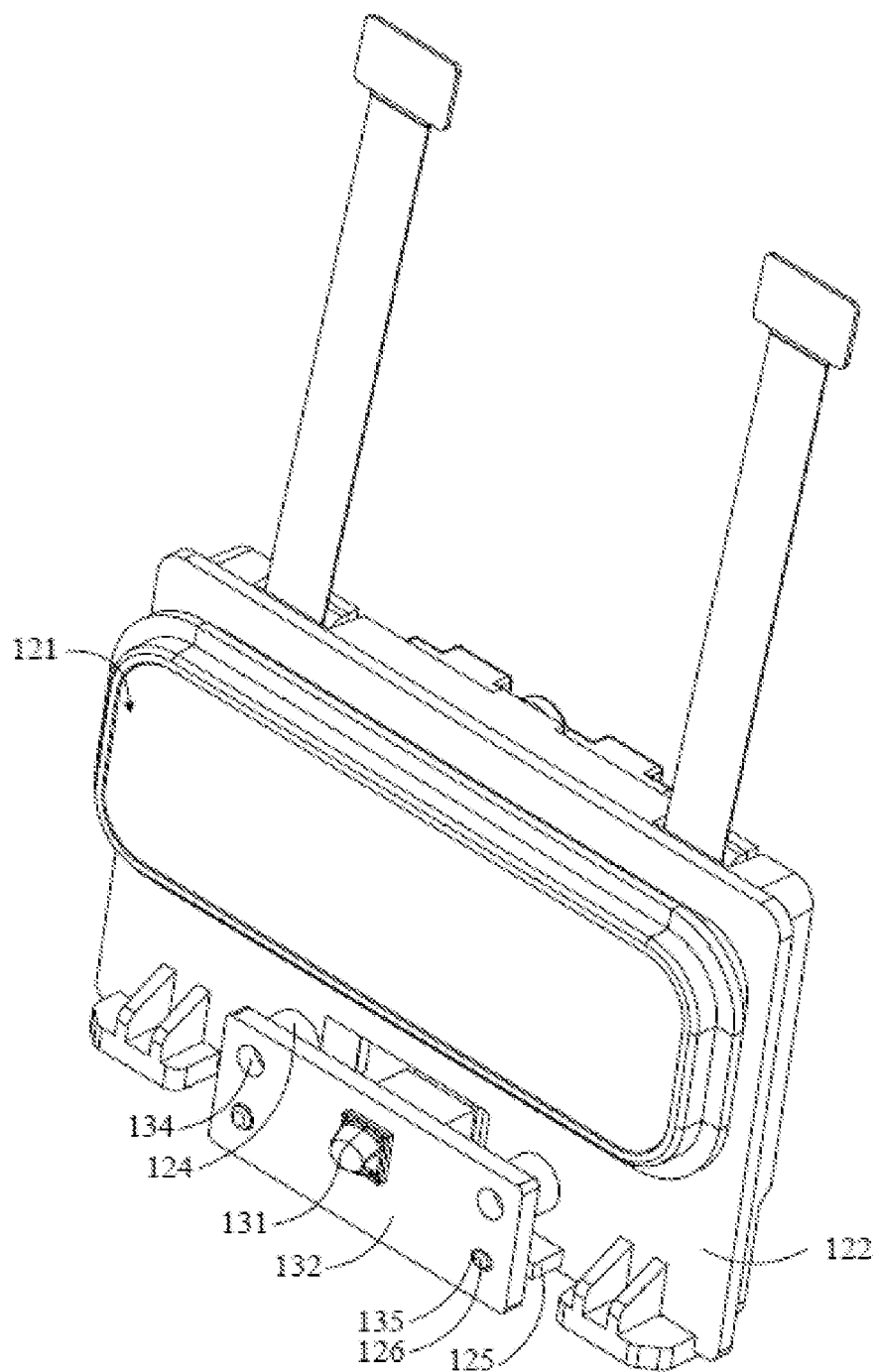
FIG. 3 illustrates a schematic diagram of a mounting component for an illuminator and a camera illustrated in FIG. 2.

Additionally, as illustrated in FIG. 2 and FIG. 3, the illuminator 131 is disposed farther to the device body 110 with respect to the camera 121, and a frontmost end of the illuminator 131 is farther to the device body 110 with respect to a frontmost end of the camera 121. Such a configuration makes the light disposed outmost to the device body and the illuminator 131 can illuminate a great area. Compared with a configuration in which the camera 121 is disposed farther to the device body 110 with respect to the illuminator 131, intensity of light is stronger, which facilitates the camera 121 to perform recognition at a high quality even in a case that intensity of ambient light is poor.

As illustrated in FIG. 2 and FIG. 3, an illuminator support 132 is disposed on the device body 110. The illuminator 131 can be mounted onto the illuminator support 132. In other words, the illuminator 131 is mounted on the device body 110 through the illuminator support. The illuminator 131 may be fixed on the illuminator support 132 by welding. In the implementation illustrated in the drawings, the illuminator support 132 has a long stripe shape. The illuminator 131 is disposed at a middle portion of the illuminator support 132.

In this implementation, a quantity of the camera 121 and a quantity of the illuminators 131 are not limited. In the implementation illustrated in the drawings, the cleaning apparatus 100 includes two cameras 121 and one illuminator 131. The two cameras 121 may be disposed horizontally, and a projection of the illuminator 131 on a horizontal plane may be located between projections of the two cameras 121 on the horizontal plane. Therefore, the one illuminator 131 can be configured for both of the two cameras 121, to ensure the entire recognition area of the two cameras 121 can have supplementary light.

Although one illuminator 131 is illustrated in the drawings, if required and/or desired, more than one illuminator 131 may be disposed based on the quantity of the cameras 121. The illuminator 131 may be located above or below the camera 121. The illuminator 131 is located below the camera 121. The illuminator 131 may be an infrared illuminator. The illuminator 131 may be a surface mounted illuminator. Optionally, the illuminator 131 may be a surface mounted infrared illuminator. The illuminator support 132 is a printed circuit board (PCB).

The illuminator 131 and the camera 121 are disposed apart, and the illuminator 131 is disposed below the camera 121. As illustrated in FIG. 2, the camera 121 and the illuminator 131 are respectively disposed in a first chamber and a second chamber, which are separated from each other. Each of the first chamber and the second chamber is provided with an opening oriented toward outside of the device body 110. While ensuring normal operation of the camera 121 and the illuminator 131, as the first chamber and the second chamber is separated from each other, it is avoided that the light emitted by the illuminator 131 is diffused to the position of the camera 121, which makes intensity of light adjacent to the camera 121 great, causing low quality of images picked up by the camera. In this implementation, a camera support 122 is disposed on the device body 110. The camera 121 is mounted on the device body 110 through the camera support 122. The illuminator support 132 may be directly connected to the camera support 122. In this implementation, no additional mounting component or structure is required, thereby avoiding an increase in a size of the device. In addition, a space in the structure of the camera support 122 may be used to mount the illuminator 131, to improve utilization of an internal space of the cleaning apparatus.

The illuminator support 132 may be detachably connected to the camera support 122 through a fastening member such as a bolt. Specifically, in the implementation illustrated in the drawings, the illuminator support 132 may be provided with a screw hole 134, and the camera support 122 may be provided with a screw post 124. The screw post 124 corresponds to the screw hole 134 in a one-to-one correspondence. A bolt can pass through and be fastened to the screw hole 134 and the screw post 124, to fix the illuminator support 132 on the camera support 122. That is, the illuminator support 132 can be mounted onto the camera support 122 by screwing a bolt into the screw hole 134 and the screw post 124. The screw hole 134 may be disposed at two ends of the illuminator support 132.

To facilitate fitting and provide fastness of the illuminator support 132, the illuminator support 132 may further be provided with a positioning hole 135. The camera support 122 is provided with a support wall 125 having a positioning post 126. The support wall 125 corresponds to the positioning hole 135 in a one-to-one correspondence. The support wall 125 can abut against the illuminator support 132, and the positioning post 126 passes through the positioning hole 135 so as to position the illuminator support 132. That is, the illuminator support 132 is fixed on the camera support 122 by abutting the support wall 125 against the illuminator support 132 and getting the positioning post 126 through the positioning hole 135. The positioning hole 135 may also be disposed at the two ends of the illuminator support 132.

A circuit board is disposed on the device body 110. The illuminator support 132 is electrically connected to the circuit board through a flexible flat cable, to supply power to the illuminator 131. A control system on the circuit board is configured to selectively turn on or turn off the illuminator 131 based on intensity of ambient light detected by the camera 121. Specifically, when insufficient or weak intensity of ambient light is detected and the illuminator 131 is required to be turned on, the control system sends a turn-on instruction to the illuminator support 132, and the illuminator support 132 supplies power to the illuminator 131. When intensity of ambient light that satisfies an image-picking-up requirement is detected and no light is required, the control system sends a turn-off instruction to the illuminator support 132, and the illuminator support 132 stops supplying power to the illuminator 131.

A mounting component 140 is disposed outside of the device body 110, wherein the mounting component 140 may be provided with the opening of the first chamber and the second chamber. The opening of the first chamber forms a photography opening 141. The photography opening 141 is located at a position outside of the camera 121 corresponding to a position of the camera 121. Camera cover 123 is disposed on the device body 110, and the camera cover 123 is located in front of the camera 121 so as to protect the camera 121. The camera cover 123 is disposed at the photography opening 141. The camera 121 can pick up an image through the camera cover 123. For the implementation illustrated in the drawings, the photography opening 141 is a stepped ring opening, and the camera cover 123 is mounted on a step of the stepped ring opening with a largest diameter. For example, the camera cover 123 can be adhered to an outward stepped ring surface.

The illuminator 131 may be located below the camera 121. Correspondingly, an illuminator cover 133 may be located below the camera cover 123, and the illuminator cover 133 and the for camera cover 123 may have a same length. Such a configuration in which the camera 121 and the illuminator 131 are disposed along a vertical direction helps to ensure that the image picking-up direction of the camera 121 and the illuminating direction of the illuminator 131 are substantially the same, thereby enhancing effect of filling light and improving the image quality of the camera 121 in a dark circumstance.

The mounting component 140 may further be provided with an illuminator opening 142, wherein the illuminator opening 142 is located at a position outside of the illuminator 131 corresponding to a position of the illuminator 131. Light emitted by the illuminator 131 can pass through the illuminator opening 142. The opening of the second chamber forms the illuminator opening 142. The illuminator cover 133 is further disposed on the device body 110, and the illuminator cover 133 is located in front of the illuminator 131 so as to protect the illuminator 131. The illuminator cover 133 is made of a material transparent to the light emitted by the illuminator 131. For example, in an implementation in which the illuminator 131 is an infrared illuminator, the illuminator cover 133 is made of a material transparent to infrared light. The illuminator cover 133 is disposed at the illuminator opening 142. In other words, the illuminator opening 142 is provided with the illuminator cover 133. For the implementation illustrated in the drawings, the illuminator opening 142 is a stepped ring opening, and the illuminator cover 133 is mounted at a step of the stepped ring opening with a largest diameter. For example, the illuminator cover 133 can be adhered to an outward stepped ring surface. The mounting component is provided with a blocking member, which forms separation between the first chamber and the second chamber.

In this implementation, both the camera cover 123 and the illuminator cover 133 are fixed by the mounting component 140. This can simplify structures and make assembling simple and easy.

Figure 4:
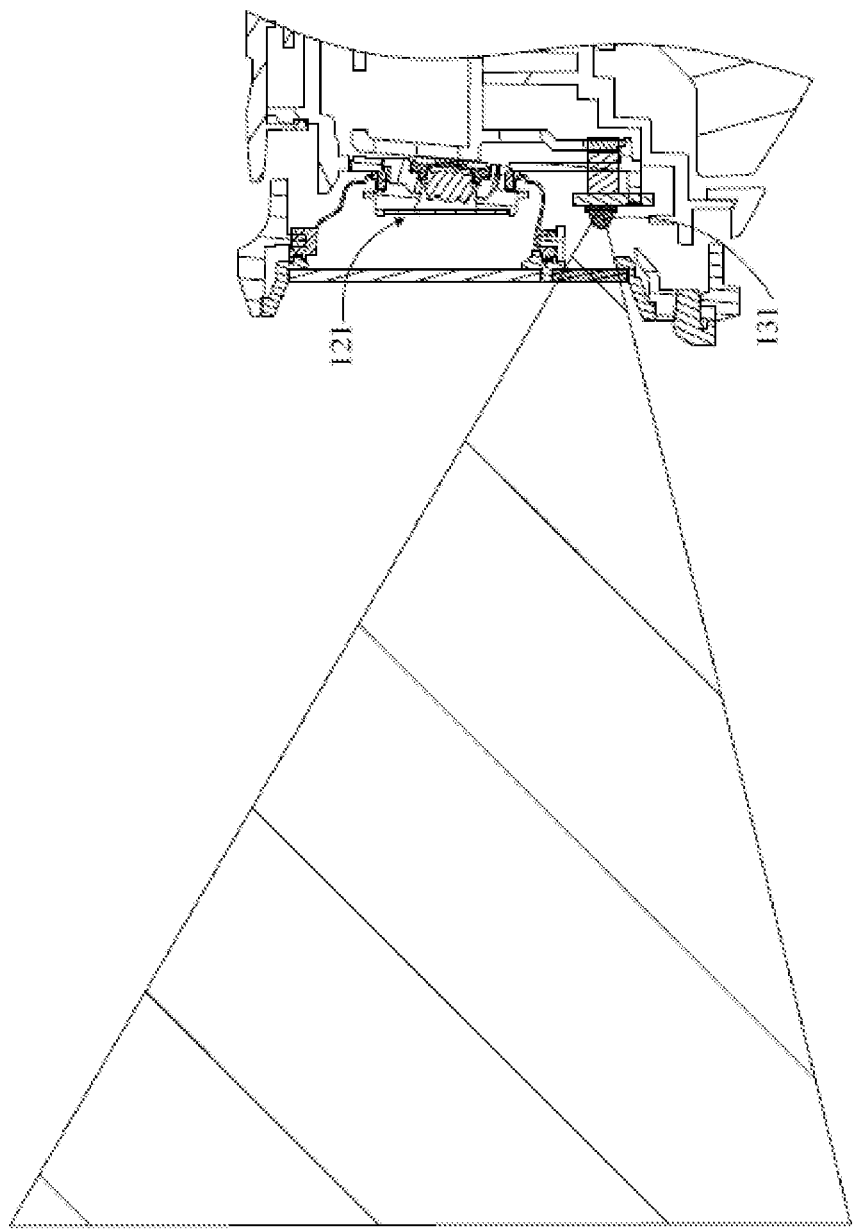
FIG. 4 is a schematic diagram of an illuminating scope of an illuminator illustrated in FIG. 2.

Referring to FIG. 4, FIG. 4 illustrates an example of an illuminating area of the illuminator 131. In this implementation, the cleaning apparatus 100 is configured so that light emitted by the illuminator 131 and passing through the illuminator opening 142 illuminates at least part of a recognition area of the camera 121, and preferably illuminates the entire recognition area. Further, a diameter of the illuminator opening 142 is designed to make the recognition area of the camera 121 taken from an environment is located within an area illuminated by the light of the illuminator 131 in this environment.

The cleaning apparatus 100 further includes a bumper 150. The bumper 150 can be disposed around the device body 110 and is connected to the device body 110. The bumper 150 is configured to cushion a collision between the cleaning apparatus 100 and a surrounding object during travelling. Both the camera 121 and the illuminator 131 are disposed around the device body 110 and at an inner side of the bumper 150. As illustrated in FIG. 2, the bumper is provided with a bumper opening, through which the camera 121 and the illuminator 131 are oriented outside of the device body 110. In this way, the bumper 150 can protect the camera 121 and the illuminator 131 from being damaged due to collision.

The mounting component 140 can be mounted onto the device body 110 directly and is exposed by means of the bumper opening. Or, the mounting component 140 may be mounted onto the bumper 150. Specifically, referring to FIG. 2, the bumper 150 is provided with a mounting opening 151, and the mounting component 140 is disposed in the mounting opening 151 and is fixed on the bumper 150, and specifically, is fixed at an edge of the bumper 150 at the mounting opening 151. Optionally, the mounting component 140 may be mounted onto the bumper 150 through a fastening member such as a bolt, and/or mounted onto the bumper 150 through a clamping structure.

The cleaning apparatus according to the present disclosure resolves a problem in the conventional technology that a camera cannot pick up an image or collects an unclear image due to an environmental factor. The cleaning apparatus according to the present disclosure can enable a camera to pick up an image with a required brightness, so that the cleaning apparatus performs accurately functions of object identification, navigation, locating, and the like, thereby improving a capability of the cleaning apparatus to sense an external environment such as topography and an obstacle and a capability of the cleaning apparatus to control the operation status of the cleaning apparatus.

The camera 121 and the illuminator 131 are disposed on the device body 110, so that the camera 121 and the illuminator 131 can be protected, and the camera 121 and the illuminator 131 are kept from being easily bumped and damaged due to exposure to the outside, thereby reducing material and labor costs for maintaining the camera and the illuminator.

Unless defined otherwise, technical and scientific terms used in this specification have same meanings as those usually understood by one of ordinary skill in the art of the present disclosure. Terms used in this specification are merely for purpose of describing a specific implementation objective, but are not intended to limit the present disclosure. Terms such as "component" and "part" in this specification may indicate a single component or part, and may indicate a combination of a plurality of components or parts. Terms such as "mount" and "dispose" in this specification may indicate that one component or part is directly attached to another component or part, and may indicate that one component or part is attached to another component or part via an intermediate component or part. In this specification, a feature described in one implementation may be applied to another implementation independently or in combination with another feature, unless the feature is not applicable in the another implementation or it is stated otherwise.

The present disclosure is described by taking the foregoing implementations as examples, but it should be understood that, the foregoing implementations are merely for taking examples and description, and are not intended to limit the present disclosure to a scope of the described implementations. In addition, it could be understood by one of ordinary skill in the art that, the present disclosure is not limited to the foregoing implementations. More variations and changes can be made according to teaching of the present disclosure, and all the variations and changes fall within a protection scope of the present disclosure. The protection scope of the present disclosure shall be defined according to the appended claims and an equivalent scope thereof

What is claimed is:

1. A cleaning apparatus, comprising:
a device body;
a camera, wherein the camera is mounted on the device body through a camera support and is oriented outside of the device body; and
an illuminator, wherein the illuminator is disposed below the camera, and is mounted on the camera support through an illuminator support and is oriented outside of the device body, wherein the illuminator support is connected to the camera support.

2. The cleaning apparatus according to claim 1, comprising a mounting component, wherein the mounting component is provided with an illuminator opening, the illuminator opening is located in front of the illuminator, and the cleaning apparatus is configured so that light emitted by the illuminator and passing through the illuminator opening illuminates at least part of a recognition area of the camera.

3. The cleaning apparatus according to claim 2, wherein an illuminator cover is disposed at the illuminator opening, and the illuminator cover is made of a material transparent to the light emitted by the illuminator.

4. The cleaning apparatus according to claim 3, wherein the mounting component is further provided with a photography opening, the photography opening is located outside of the camera, a camera cover is disposed at the photography opening, and the camera picks up an image through the camera cover.

5. The cleaning apparatus according to claim 2, further comprising a bumper connected to the device body, wherein the bumper is provided with a bumper opening through which the mounting component is exposed.

6. The cleaning apparatus according to claim 1, wherein the illuminator support is provided with a positioning hole, the camera support is provided with a positioning post, and the positioning post passes through the positioning hole to fix the illuminator support on the camera support.

7. The cleaning apparatus according to claim 1, wherein the illuminator is a surface mounted illuminator, and the illuminator support is a PCB.

8. The cleaning apparatus according to claim 1, wherein a circuit board is disposed on the device body, the illuminator support is electrically connected to the circuit board, and a control system on the circuit board is configured to selectively turn on or turn off the illuminator based on intensity of ambient light detected by the camera.

9. The cleaning apparatus according to claim 1, wherein both the camera and the illuminator are disposed at a substantially frontmost end of the device body in a travelling direction.

10. The cleaning apparatus according to claim 9, wherein the illuminator is disposed farther than the camera with respect to the device body.

11. A cleaning apparatus, comprising:
a device body;
a bumper, connected to the device body and comprising a bumper opening;
a camera, mounted on the device body; and
an illuminator, disposed below the camera and mounted on the device body;
wherein both the camera and the illuminator are oriented outside of the device body through single bumper opening, wherein a mounting component is disposed outside of the device body and provided with a blocking member.

12. The cleaning apparatus according to claim 11, wherein the mounting component is provided with an illuminator opening, which is disposed in front of the illuminator such that light emitted by the illuminator and passing through the illuminator opening illuminates at least part of a recognition area of the camera.

13. The cleaning apparatus according to claim 12, wherein an illuminator cover is disposed at the illuminator opening, and the illuminator cover is made of a material transparent to the light emitted by the illuminator.

14. The cleaning apparatus according to claim 12, wherein the mounting component is further provided with a photography opening which is disposed outside of the camera, and a camera cover, through which the camera picks up an image, is disposed at the photography opening.

15. The cleaning apparatus according to claim 12, wherein the mounting component is exposed through the single bumper opening.

16. The cleaning apparatus according to claim 11, wherein the illuminator is a surface mounted illuminator.

17. The cleaning apparatus according to claim 11, wherein both the camera and the illuminator are disposed at a substantially frontmost end of the device body in a travelling direction.

18. The cleaning apparatus according to claim 17, wherein the illuminator is disposed farther than the camera with respect to the device body.

19. The cleaning apparatus according to claim 15, wherein the camera and the illuminator are respectively disposed in a first chamber and a second chamber which are separated from each other, and the blocking member forms separation between the first chamber and the second chamber.

* * * * *